3,101,344
PROCESS FOR PREPARING TETRACYANO-1,4-DITHIIN
Robert D. Vest, Wilmington, Del., assignor to E. I. du Pont de Nemours and Company, Wilmington, Del., a corporation of Delaware
No Drawing. Filed Feb. 28, 1961, Ser. No. 92,140
16 Claims. (Cl. 260—327)

This invention relates to, and has as its principal object provision of, a new process for preparing tetracyano-1,4-dithiin. More particularly, it is concerned with a process shorter and simpler than any heretofore proposed and one which has the further advantages of yielding tetracyano-1,4-dithiin essentially free of other cyanosulfides.

Tetracyano-1,4-dithiin, i.e., the cyclic percyano sulfide having the structure

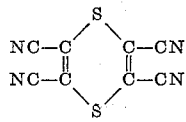

has been briefly reported by G. Bähr in Angewandte Chemie 70, 606–7 (1958). It is a reactive and versatile chemical of already proven technical value. Among its uses may be cited its reaction with aromatic or heterocyclic amines or azomethines to give pigments or dyes; its conversion by mild pyrolysis to tetracyanothiophene, itself a source of valuable pigments and dyes in the same manner; and its reaction with alkali or alkaline earth metal cyanides whereby a metal tetracyanoethylenide is obtained in high yields and readily converted by oxidation with chlorine or bromine to the technically highly useful tetracyanoethylene. These various reactions of tetracyano-1,4-dithiin are described and claimed in United States patent applications assigned to the assignee of this application.

Insofar as the present inventor is aware, all the previously proposed methods of synthesizing tetracyano-1,4-dithiin use, as the organic reactant, disodium dimercaptomaleonitrile, $$NC-C-SNa$$
$$NC-C-SNa$$

These methods, besides that sketchily mentioned by Bähr (loc. cit.), include the reaction of disodium dimercaptomaleonitrile with 1,2-dichloro-1,2-dicyanoethylene or with perchloryl fluoride, as described in application Ser. No. 764,516, filed by H. E. Simmons on October 1, 1958; or with a sulfur chloride or oxychloride, as described in application Ser. No. 798,333, filed By D.C. Blomstrom and W. C. Smith on March 10, 1959, now U.S. Patent 3,008,967.

As reported by Bähr [loc. cit. and Ber. 90, 438 (1957)], disodium dimercaptomaleonitrile is prepared from sodium cyanodithioformate,

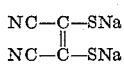

itself prepared from carbon disulfide and sodium cyanide, by a method which involves allowing sodium cyanodithioformate to disproportionate spontaneously, with concomitant loss of sulfur, in a solvent such as water or chloroform, according to the equation

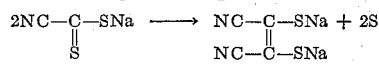

This preparation is time-consuming and expensive, as it involves the additional steps of separating the sulfur formed and purifying the disodium dimercaptomaleonitrile. Thus, a synthesis of tetracyano-1,4-dithiin using as the starting material sodium cyanodithioformate itself or, even better, using in one single operation its initial ingredients, viz., carbon disulfide and sodium cyanide, is a highly desirable goal. Furthermore, some at least of the previously proposed methods yield tetracyano-1,4-dithiin in admixture with substantial proportions of another cyclic cyanosulfide having the empirical formula $C_8N_4S_3$, whose structure has recently been found to be that of an isothiazole derivative, p-dithiino-[c]-isothiazole-3,5,6-tricarbonitrile,

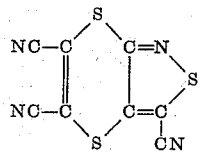

For many purposes, e.g., the preparation of tetracyanothiophene, it is necessary to use tetracyano-1,4-dithiin free from this coproduct. The new synthesis of tetracyano-1,4-dithiin described below avoids both of the above-mentioned disadvantages of the prior syntheses.

It has been disclosed in Australian patent application 48,349 (Example V) and in its equivalent, U.S. Patent 3,000,780, that by treating sodium cyanodithioformate, prepared in situ from sodium cyanide and carbon disulfide, with a specific oxidizing agent, ferric chloride, a compound melting at 181–183° C. and having the empirical formula $C_8N_4S_3$ was produced, which was assigned the structure of tetracyano-1,2,5-trithiepin,

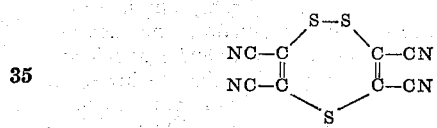

In the course of the work leading to the present invention, the disclosed procedure was repeated. These experiments showed that the reaction product so obtained was indeed a compound having the reported melting point and empirical formula (this compound, however, is not tetracyano-1,2,5-triethiepin but its isomer, the above-mentioned p - dithiino-[c]-isothiazole-3,5,6-tricarbonitrile). No detectable amount of tetracyano-1,4-dithiin was found in the product of this reaction. In view of the disclosures of the Australian application, it was therefore entirely unexpected and surprising to find that, by treating sodium cyanodithioformate, either preformed or made in situ from its components, with the specific oxidizing agents and under the specific reaction conditions described below, the reaction product was tetracyano-1,4-dithiin essentially free of cyanosulfide of formula $C_8N_4S_3$.

This invention provides a process of preparing tetracyano-1,4-dithiin which comprises bringing an alkali metal or a tetraalkylammonium salt of cyanodithioformic acid in contact with one of the oxidizing agents chlorine, bromine, thionyl chloride or sulfuryl chloride, at a temperature not exceeding 75° C. in an essentially anhydrous organic solvent in which the cyanodithioformic acid salt is stable, and, as soon as possible after the end of the reaction and within a period of time not exceeding one hour therefrom, separating the tetracyano-1,4-dithiin as a solid from its solution in the organic solvent.

In a preferred embodiment of the process, carbon disulfide and sodium cyanide are brought in contact in a liquid, N,N-dihydrocarbyl carbonamide solvent, and the sodium cyanodithioformate thus formed is reacted directly, i.e., without prior isolation, with the oxidizing agent in the same reaction medium.

The reaction may be represented by the equation (using sodium cyanodithioformate as the illustrative cyanodithioformic acid salt);

(1)

$$4NC-\underset{\underset{S}{\|}}{C}-SNa + 2X_2 \longrightarrow$$ 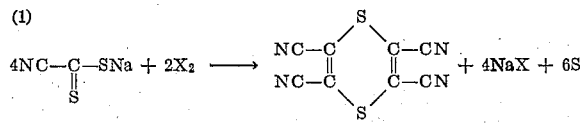 $$+ 4NaX + 6S$$

when an elemental halogen X of atomic number 17–35, i.e., chlorine or bromine, is used as the oxilizing agent, or by the equation (2)

$$4NC-\underset{\underset{S}{\|}}{C}-SNa + 2SOCl_2 \longrightarrow$$

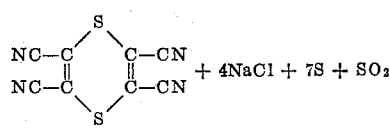 $$+ 4NaCl + 7S + SO_2$$

(3)

$$4NC-\underset{\underset{S}{\|}}{C}-SNa + 2SO_2Cl_2 \longrightarrow$$

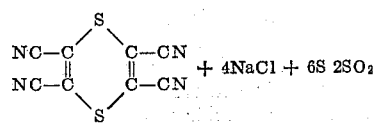 $$+ 4NaCl + 6S\, 2SO_2$$

when thionyl chlorides or sulfuryl chloride are used.

In this process, the organic starting material can be sodium or potassium cyanodithioformate, or a tetraalkyl-ammonium cyanodithioformate, preferably one in which the alkyl groups have one to two carbon atoms, i.e., are methyl or ethyl. For the sake of brevity and convenience, the discussion which follows will describe the invention with reference to sodium cyanodithioformate, the most stable and economical starting material, and therefore the preferred one.

In the practice of this invention, the starting material sodium cyanodithioformate, can be either prepared separately and isolated prior to reaction, or it can be formed in situ from its components and reacted with the oxidizing agent without prior isolation. In either case, it is prepared by bringing together carbon disulfide and sodium cyanide under essentially anhydrous conditions in a solvent which is a carboxylic acid amide having no hydrogen on the amido nitrogen. This type of solvent appears to be specific since the reaction does not take place in other solvent media, even those in which the preformed sodium cyanodithioformate is stable, i.e., does not disproportionate with loss of sulfur. Suitable amide solvents, liquid under the operating conditions, are the N,N-dialkyl amides, where the alkyl groups have from 1–4 carbon atoms, of carboxylic acids of 1–3 carbon atoms, e.g., N,N-dimethyl-, N,N-diethyl-, N,N-diisopropyl-, and N,N-dibutylformamide, N,N-dimethyl-, NN-diethyl-, and N,N-dibutylacetamide, N,N-dimethylpropionamide, etc. Other suitable amide solvents are the N-alkyl cyclic amides (lactams), where the alkyl group has from 1–4 carbon atoms, of α,ω-aminoacids of 4–5 carbon atoms, e.g., N-methyl-, N-ethyl-, N-isopropyl-, and N-butylpyrrolidone or N-methyl-, N-ethyl-, N-propylpiperidone. The preferred solvents are N,N-dimethylformamide and N,N-dimethylacetamide.

While the preparation of sodium cyanodithioformate is not part of this invention, the following details are given for informative purposes. To a solution or suspension of sodium cyanide in one of the amide solvents defined above is added gradually and with stirring an equimolar amount, or a slight excess thereover, of carbon disulfide. The reaction is exothermic. After the spontaneous temperature rise has subsided, the mixture may be heated to 45–65° C. for a short period to complete the reaction. However, it is preferred not to exceed a temperature of about 75° C. There is thus obtained a stable solution of sodium cyanodithioformate in the amide solvent. In the preferred embodiment of the invention, as already noted, this solution, if desired diluted with the same or a different inert solvent, is used directly in the subsequent reaction with an oxidizing agent to form tetracyano-1,4-dithiin. If desired, however, the sodium cyanodithioformate can be isolated as a crystalline solid, for example by cooling the solution, with or without prior partial evaporation of the solvent, and separating the solid by filtration. The preformed sodium cyanodithioformate is then transferred to another liquid solvent medium in which the subsequent reaction with the oxidizing agent is then carried out. Sodium cyanodithioformate is usually prepared in N,N-dimethylformamide solution. In this case, the crystalline product contains 3 moles of solvent of crystallization, i.e., it has the composition $$NC-\underset{\underset{S}{\|}}{C}-SNa \cdot 3HCON(CH_3)_2$$

and it is used in this form.

As the medium for the oxidation reaction, there is used a substantially anhydrous organic material, liquid at the operating temperature, which has at least moderate solvent power for both sodium cyanodithioformate and tetracyano-1,4-dithiin, e.g., which dissolves them to the extent of at least 5% by weight at 20° C. An essential requirement of the solvent is that it be one in which sodium cyanodithioformate is stable, that is, does not disproportionate to disodium dimercaptomaleonitrile and sulfur by the previously mentioned spontaneous disproportionation. A very simple and rapid visual test makes it possible to ascertain at once whether or not a given solvent is suitable from this standpoint. This consists in dissolving a small amount of sodium cyanodithioformate in the solvent being tested at room temperature (about 20° C.). If no precipitation of sulfur takes place within a period of one hour, the solvent can be considered one in which sodium cyanodithioformate is stable.

Examples of suitable solvents include, besides the previously discussed N,N-dialkyl amides and N-alkyl lactams, nitriles such as acetonitrile, propionitrile, butyronitrile, adiponitrile, benzonitrile, etc.; acyclic or cyclic ethers such as di-n-butyl ether, 1,2-dimethoxyethane, 1,2-diethoxyethane, tetrahydrofuran, dioxane, etc.; ketones such as acetone, di-n-butyl ketone, methyl ethyl ketone, etc.; sulfides, sulfoxides and sulfones such as diethyl sulfide, di-n-butyl sulfide, dimethyl sulfoxide, diethyl sulfoxide, tetramethylene cyclic sulfone, etc.; and the like. The solvent need not be unreactive towards the halogen or sulfur oxyhalide reactant although, of course, it should not be so reactive as to seriously interfere with the course of the main reaction. Preferably, the solvent, in addition to being inert towards sodium cyanodithioformate as shown by the above-described test, is free from active hydrogen detectable by the well-known Zerewitinoff test, that is, of hydrogen attached to oxygen, sulfur or nitrogen, and free of aliphatic carbon-to-carbon unsaturation. The most useful and economical solvents, therefore the preferred ones, are those whose molecule contains not more than ten carbon atoms. For easier separation of the tetracyano-1,4-dithiin from the reaction mixture, solvents which are miscible with water are especially useful.

The amount of solvent is immaterial provided it is sufficient to dissolve the tetracyano-1,4-dithiin formed and to maintain the inorganic reaction products in suspension.

The oxidizing agent used for converting sodium cyanodithioformate to tetracyano-1,4-dithiin is one of the following halogens or oxyhalides: chlorine, bromine, thionyl chloride and sulfuryl chloride. These agents appear to be specific if formation of the cyanotrisulfide $C_6N_4S_3$ is to be avoided, which is one of the objects of this invention.

Thus, for example, iodine is not suitable since its use in this reaction leads chiefly to the trisulfide. This is also the case with other oxidizing agents such as ferric chloride, as already noted. The preferred reactants for use in this process, because of the better results obtained, are chlorine and bromine, and especially chlorine since it is much more economical.

The oxidizing agent is preferably used in approximately stoichiometrical amounts, i.e., about one-half mole per mole of sodium cyanodithioformate. It can be used in slight excess, up to an about 50% molar excess, to insure completeness of the reaction, but larger excesses lead to side reactions which decrease the yield and are not recommended. It is readily possible to ascertain the end of the reaction, i.e., the stage at which all of the sodium cyanodithioformate has reacted. One characteristic and very noticeable end point is the change in color of the reaction mixture from nearly black or dark red to pale yellow or orange. Another end point is the absence of further precipitation of sulfur and/or sodium chloride from the reaction solution or a sample withdrawn from it upon treatment with an additional quantity of the oxidizing agent.

The reaction of sodium cyanodithioformate with the halogen-containing oxidizing agent is exothermic. It can take place at an external temperature as low as —20° C. or even lower. The reaction temperature can be as high as 75° C. but higher temperatures are not recommended because of the increased possibility of side reactions between the organic reaction medium and the halogen-containing oxidizing agent. The preferred reaction temperature lies within the range of from 0° to 50° C.

A critical feature of this process is the quick separation, as soon as possible after completion of the reaction, of the tetracyano-1,4-dithiin as a solid from its solution in the organic solvent where it is in contact with dissolved sulfur. Prompt removal of the tetracyano-1,4-dithiin from contact with either the sulfur formed or the solvent is essential to avoid formation of the cyclic cyanotrisulfide $C_8N_4S_3$, i.e., p-dithiino-[c]-isothiazole-3,5,6-tricarbonitrile. This is for the reason that when tetracyano-1,4-dithiin is allowed to remain for an appreciable length of time in a system comprising a solvent in which it is soluble and sulfur, there is gradual, more or less rapid formation of the trisulfide $C_8N_4S_3$ at the expense of the tetracyano-1,4-dithiin, this reaction being presumably catalyzed by the presence of traces of nucleophilic agents such as sodium cyanide or bases. However, this reaction does not take place between solid sulfur and solid tetracyano-1,4-dithiin, and it is immaterial whether or not the solid reaction product is mixed with sulfur, from which it can be separated later by solvent extraction.

Separation of the solid tetracyano-1,4-dithiin from its solution should be effected as soon as feasible after all of the sodium cyanodithioformate has reacted, as determined by one of the above-mentioned tests, or, alternatively, after addition of the calculated amount of oxidizing agent or a slight excess thereover. In practice, of course, the elapsed time between completion of the reaction and separation of the tetracyano-1,4-dithiin will vary depending on the experimental conditions such as the amount of reaction mixture to be handled. For best results, however, this interval of time should not exceed about one hour.

The separation of the tetracyano-1,4-dithiin can be done in various ways, one of the most practical of which consists in removing by filtration the solids formed during the reaction (sodium chloride and undissolved sulfur) and pouring the filtrate in water or another non-solvent for tetracyano-1,4-dithiin, thus precipitating the latter from its organic solvent solution. Alternatively, the entire reaction mixture can be poured in water, thus dissolving the sodium chloride and precipitating a mixture of tetracyano-1,4-dithiin and sulfur. These methods are especially applicable when the organic reaction medium is miscible with or appreciably soluble in water. When this is not the case, an organic non-solvent for the tetracyano-1,4-dithiin, e.g., chloroform of carbon tetrachloride, can be used as the precipitating medium. When the reaction medium is volatile, another separation method consists in quickly evaporating the solvent, preferably under reduced pressure, and extracting the tetracyano-1,4-dithiin from the solid residue.

If necessary, the tetracyano-1,4-dithiin obtained by this process can be purified in various ways. If it is mixed with sulfur, the sulfur can be readily removed by extraction with carbon disulfide, in which tetracyano-1,4-dithiin is insoluble, or else the latter can itself be extracted from the mixture with a solvent such as acetone. The crude tetracyano-1,4-dithiin can be recrystallized from various solvents, such as benzene, toluene, ethylene dichloride or tetrahydrofuran, or digested in hot ethylene dichloride followed by cooling. It may also be purified by sublimation, or by precipitating it from its solution in a solvent such as dimethylformamide by addition of water or chloroform. The purified product melts at 208–209° C.

As already noted, the tetracyano-1,4-dithiin obtained by this process is essentially free of p-dithiino-[c]-isothiazole-3,5,6-tricarbonitrile. Infrared analysis allows easy detection of even very small amounts of this impurity thanks to its very strong absorption at 7.62 micron. The infrared spectra of tetracyano-1,4-dithiin and p-dithiino-[c]-isothiazole-3,5,6-tricarbonitrile are given below for information.

*Tetracyano-1,4-dithiin.*—Absorptions at 4.5, 6.58, 8.5, 8.65, 9.75, 9.89, and 10.25μ. The region 7.0 to 8.0 is free of absorptions.

*p - Dithiino - [c] - isothiazole - 3,5,6 - tricarbonitrile.*—Absorptions at 4.49, 6.50, 6.70, 7.62, 8.60, 8.70, 8.90, 9.70, and 12.38μ.

In addition, the amount of tetracyano-1,4-dithiin present in a crude reaction product can be estimated quite accurately by ultraviolet analysis, utilizing its absorption band $\lambda_{max}$. 331 mμ with the molar extinction coefficient ε=7,190.

The following examples illustrate the invention in greater detail.

Example I

A solution of 26 g. (0.076 mole) of sodium cyanodithioformate containing 3 moles per mole of N,N-dimethylformamide in 100 ml. of practical grade acetonitrile was stirred at 0° C. while 8.0 g. (1 gram atom) of bromine was added over a period of 10 minutes. During this addition, the dark red solution changed to a bright orange suspension of inorganic solids. This suspension was filtered at once and the filtrate was poured with stirring into 900 ml. of water. The resulting orange precipitate was collected by filtration, air-dried and recrystallized from ethylene dichloride to give 1.79 g. (43% yield) of pure tetracyano-1,4-dithiin, characterized by its melting point and infrared spectrum.

Example II

Sodium cyanodithioformate was prepared by adding dropwise over a 15-minute period 25 ml. of carbon disulfide to a stirred solution of 9.8 g. (0.2 mole) of sodium cyanide in 100 ml. of N,N-dimethylacetamide at about 20° C. After the exothermic reaction had subsided, the mixture was heated to 55° C. for 45 minutes, then cooled to between —5 and 0° C.

To the cold solution was added dropwise with stirring 15.6 g. (0.13 mole) of thionyl chloride over a 30-minute period, during which time the color of the reaction mixture changed from dark brown to red to orange. The mixture was then stirred for one hour at ambient temperature (about 20° C.) and poured into a mixture of 2 liters of water and 500 ml. of ethylene dichloride. The organic layer was separated, washed thoroughly with water, dried over sodium sulfate and evaporated to dryness. The residue consisted essentially of tetracyano-1,4-dithiin, which was purified by chromatography in methylene dichloride solution over acid-washed alumina and characterized by its infrared spectrum.

Example III

A stream of gaseous chlorine was passed through a solution of 51.6 g. (0.15 mole) of sodium cyanodithioformate containing 3 moles per mole of N,N-dimethylformide in 50 ml. of acetonitrile cooled in an ice bath. The reaction was completed in 10 minutes, as shown by the change in color from dark red to yellow. The reaction mixture was stirred for an additional 5 minutes at 0° C., after which it was poured into 1.5 liters of water. The precipitate which formed was isolated by filtration. On recrystallization from ethylene dichloride, in which sulfur is more soluble in the cold than tetracyano-1,4-dithiin, there was obtained 3.94 g. (49% yield) of pure tetracyano-1,4-dithiin, characterized by its infrared spectrum.

Repeating this example under essentially the same conditions except that the acetonitrile was replaced by 50 ml. of redistilled N,N-dimethylformamide gave a 54% yield of pure tetracyano-1,4-dithiin.

Example IV

This example illustrates the preferred mode of carrying out the invention.

A suspension of 196 g. (4.0 moles) of sodium cyanide in 1500 ml. of technical grade N,N-dimethylformamide was placed in a flask equipped with mechanical stirrer, thermometer, reflux condenser and dropping funnel. To the stirred suspension was added dropwise over a period of about one hour 304 g. (4.0 moles) of carbon disulfide. During the addition the temperature was allowed to rise spontaneously to 55° C. and then held at 55–60° C. by adjusting the rate of addition or by external cooling. After all the carbon disulfide had been added, the solution was maintained at 55–60° C. for one hour with stirring, and then diluted with 500 ml. of practical grade acetonitrile for the purpose of having a more fluid suspension during the subsequent step. The solution of sodium cyanodithioformate so obtained may be allowed to stand for several days, if desired, without affecting the yield of the subsequent reaction.

The dropping funnel was replaced by a gas inlet tube extending about 1″ below the level of the liquid. The solution was cooled to 25° C. and a slow stream of chlorine gas was passed through it with vigorous stirring. As the reaction proceeded a gradual color change from black to bright red to yellow was observed. The chlorination was regulated so that at no time was the yellow color of chlorine seen in the exhaust line, and so that the internal temperature remained between 20 and 30° C. Approximately one hour was required for completion of the reaction, as shown by the color of the solution and by the fact that, when the stirring was stopped and the suspended solids were allowed to settle, addition of a little chlorine caused no further reaction.

After standing for 5 minutes without stirring, approximately three-fourths of the supernatant liquid was decanted from the inorganic solids and poured immediately into about 8 liters of water. The residue in the flask was treated with 40 g. of diatomaceous earth to facilitate filtration, the solids were removed by filtration and the filtrate was at once poured into about 4 liters of water with stirring. The precipitates obtained in both water treatments were collected by filtration, combined, washed thoroughly with water and air-dried. There was obtained 175 g. of crude reaction product which was found by ultraviolet analysis to contain 90% of tetracyano-1,4-dithiin (yield about 72%). The product contained no p-dithiino-[c]-isothiazole-3,5,6-tricarbonitrile. The reaction product can be purified by digestion with boiling ethylene dichloride for about one hour, followed by cooling to 0° C. for 2–3 hours, removing the solvent by filtration and washing the residue of pure tetracyano-1,4-dithiin with chloroform or a small amount of methylene dichloride.

Substantially equivalent results are obtained when the total reaction product is drowned in water without preliminary separation of the inorganic solids by settling and/or filtration. The precipitate so obtained, which contains the sulfur formed in the reaction, can be purified by extraction with acetone, which dissolves the tetracyano-1,4-dithiin, or by extraction with carbon disulfide to remove the sulfur, followed by crystallization of the residue from ethylene dichloride. The tetracyano-1,4-dithiin contains no cyanotrisulfide $C_8N_4S_3$.

Example V

Sodium cyanodithioformate was prepared in 50 ml. of N,N-dimethylformamide from 14.6 g. (0.2 mole) of carbon disulfide and 9.8 g. (0.2 mole) of sodium cyanide. This solution was stirred at 10–20° C. while 11.8 g. (0.1 mole) of thionyl chloride was added dropwise over a period of 15 minutes. The reaction mixture was poured at once with stirring into 400 ml. of water and the precipitate was removed by filtration and dried. This crude product was dissolved in 150 ml. of acetone, the solution was treated with decolorizing carbon, and diluted with an equal volume of water. The precipitate was tetracyano-1,4-dithiin, obtained in 20% yield. It was characterized by its infrared spectrum and contained no p-dithiino-[c]-isothiazole-3,5,6-tricarbonitrile.

Example VI

To a solution of 0.1 mole of sodium cyanodithioformate in 50 ml. of N,N-dimethylformamide was added at 10–20° C. with stirring 13.4 g. (0.1 mole) of sulfuryl chloride over a period of 15 minutes. The reaction product was worked up as described in Example V. There was obtained an 18% yield of pure tetracyano-1,4-dithiin, characterized by its infrared spectrum.

Since obvious modifications and equivalents will be evident to those skilled in the chemical arts, I propose to be bound solely by the appended claims.

The embodiments of the invention in which an exclusive property or privilege is claimed are defined as follows:

1. In the preparation of tetracyano-1,4-dithiin, the steps which comprise (1) contacting, at a temperature not greater than about 75° C., a salt of the group consisting of the alkali metal and tetra (1–2 carbon alkyl) ammonium salts of cyanodithioformic acid with an oxidizing agent of the group consisting of chlorine, bromine, thionyl chloride and sulfuryl chloride in an essentially anhydrous liquid organic solvent in which the salt of cyanodithioformic acid is stable and (2) subsequently, within about one hour, separating tetracyano-1,4-dithiin from the solvent.

2. The process of claim 1 wherein the organic solvent is a 1–4 carbon alkyl N,N-dialkyl amide of a 1–3 carbon carboxylic acid.

3. The process of claim 1 wherein the organic solvent is a 1–4 carbon alkyl N-alkyl lactam of a 4–5 carbon $\alpha,\omega$-aminoacid.

4. The process of claim 1 wherein the salt of cyanodithioformic acid is formed in situ.

5. The process which comprises (1) contacting, at a temperature not greater than about 75° C., sodium cyanodithioformate with an oxidizing agent of the group consisting of chlorine, bromine, thionyl chloride and sulfuryl chloride in an essentially anhydrous liquid organic solvent in which sodium cyanodithioformate is stable and (2) subsequently, within about one hour, separating tetracyano-1,4-dithiin from the solvent.

6. The process which comprises (1) oxidizing sodium cyanodithioformate with bromine in liquid acetonitrile at a temperature not greater than about 75° C. and (2) subsequently, within about one hour, separating tetracyano-1,4-dithiin from the acetonitrile.

7. The process which comprises (1) oxidizing sodium cyanodithioformate with chlorine in liquid acetonitrile at a temperature not greater than about 75° C. and (2) subsequently, within about one hour, separating tetracyano-1,4-dithiin from the acetonitrile.

8. The process which comprises (1) oxidizing sodium cyanodithioformate with chlorine in liquid N,N-dimethylformamide at a temperature not greater than about 75° C. and (2) subsequently, within about one hour, separating tetracyano-1,4-dithiin from the N,N-dimethylformamide.

9. The process which comprises (1) oxidizing sodium cyanodithioformate with sulfuryl chloride in liquid N,N-dimethyformamide at a temperature not greater than about 75° C. and (2) subsequently, within about one hour, separating tetracyano-1,4-dithiin from the N,N-dimethylformamide.

10. The process which comprises (1) oxidizing sodium cyanodithioformate with thionyl chloride in liquid N,N-dimethyl-acetamide at a temperature not greater than about 75° C. and (2) subsequently, within about one hour, separating tetracyano-1,4-dithiin from the N,N-dimethylacetamide.

11. The process which comprises (1) reacting sodium cyanide and carbon disulfide in an essentially anhydrous 1-4 carbon alkyl N,N-dialkyl amide of a 1-3 carbon carboxylic acid (2) adding a member of the group consisting of chlorine, bromine, thionyl chloride and sulfuryl chloride to the resultant reaction mixture at a temperature not greater than about 75° C., and (3) subsequently, within about one hour, separating out tetracyano-1,4-dithiin.

12. The process of claim 11 wherein the liquid amide is selected from the group consisting of N,N-dimethylformamide and N,N-dimethylacetamide.

13. The process which comprises (1) reacting sodium cyanide and carbon disulfide in essentially anhydrous N,N-dimethylacetamide, (2) adding thionyl chloride to the resultant reaction mixture at a temperature not greater than about 75° C., and (3) subsequently, within about one hour, separating out tetracyano-1,4-dithiin.

14. The process which comprises (1) reacting sodium cyanide and carbon disulfide in essentially anhydrous N,N-dimethylformamide, (2) adding chlorine to the resultant reaction mixture at a temperature not greater than about 75° C., and (3) subsequently, within about one hour, separating out tetracyano-1,4-dithiin.

15. The process which comprises (1) reacting sodium cyanide and carbon disulfide in essentially anhydrous N,N-dimethylformamide, (2) adding thionyl chloride to the resultant reaction mixture at a temperature not greater than about 75° C., and (3) subsequently, within about one hour, separating out tetracyano-1,4-dithiin.

16. The process of claim 5 wherein the organic solvent is selected from the group consisting of N,N-dimethylformamide, N,N-dimethylacetamide, acetonitrile and mixtures thereof.

References Cited in the file of this patent
UNITED STATES PATENTS
3,000,780     Van Schoor et al. _____ Sept. 19, 1961

OTHER REFERENCES

Baker et al.: Jour. Amer. Chem. Soc., volume 58, pages 262–64 (1936).